United States Patent [19]

Ikeno

[11] Patent Number: 5,625,450
[45] Date of Patent: Apr. 29, 1997

[54] APPARATUS FOR MEASURING CONNECTION LOSS AND REFLECTION ATTENUATION OF OPTICAL FIBER CORD

[75] Inventor: Hideki Ikeno, Tokyo, Japan

[73] Assignee: Ando Electric Co., Ltd., Tokyo, Japan

[21] Appl. No.: 607,664

[22] Filed: Feb. 27, 1996

[30] Foreign Application Priority Data

Feb. 28, 1995 [JP] Japan ................. 7-065016

[51] Int. Cl.$^6$ ................. G01N 21/59
[52] U.S. Cl. ................. 356/73.1
[58] Field of Search ................. 356/73.1

[56] References Cited

FOREIGN PATENT DOCUMENTS

| | | | |
|---|---|---|---|
| 58-100733 | 6/1983 | Japan | 356/73.1 |
| 5-40074 | 2/1993 | Japan | 356/73.1 |

*Primary Examiner*—Vincent P. McGraw
*Attorney, Agent, or Firm*—Finnegan, Henderson, Farabow, Garrett & Dunner, L.L.P.

[57] ABSTRACT

An apparatus for determining connection loss and reflection attenuation of an optical fiber cord is simple to use and avoids cumbersome and slow two-stage determination using a total reflection cord. The present apparatus has a total reflection device within the measuring apparatus. To determine a contact loss, first end connector of the test cord is inserted in the apparatus, and the output power from the opposite second end connector is measured to give contact loss data. Prior to reflection attenuation determination, the second end is inserted in the total reflection device to measure the reference output power. In this configuration, the light propagated through the test cord is totally reflected back through the test cord at the total reflection device to be measured by a photo-detector, disposed within the apparatus, to give reference light data. To determine reflection attenuation, the opposite end of the test cord is now removed from the apparatus and its surface is coated with a refraction adjusting coating to reduce the reflection from the opposite end to nearly zero. The light propagating through the test cord is all reflected back at the surface of the first end connector to be measured by the photo-detector, and produces reflected light data. The reflection attenuation is calculated from the reference light data and the reflected light data. The apparatus thus provides precise data for these parameters very quickly.

2 Claims, 3 Drawing Sheets (DETERMINING A CONNECTION LOSS)

(DETERMINING THE REFERENCE INTENSITY)

(DETERMINING THE REFLECTION ATTENUATION)

(BEFORE CONNECTION)

(AFTER CONNECTION)

(DETERMINING A CONNECTION LOSS)

(DETERMINING THE REFERENCE INTENSITY)

(DETERMINING THE REFLECTION ATTENUATION)

APPARATUS FOR MEASURING CONNECTION LOSS AND REFLECTION ATTENUATION OF OPTICAL FIBER CORD

BACKGROUND OF THE INVENTION

1. Field of the Invention

The present invention relates in general to optical loss measuring apparatus, and relates in particular to an apparatus for measuring connection loss and reflection attenuation in an optical cord provided with physical contact type connectors.

2. Description of the Related Art

A conventional apparatus for determining optical losses will be explained with reference to illustrations in FIG. 3. This is a case of measuring both the connection loss and reflection attenuation using the same apparatus.

As shown in FIG. 3, the optical loss measuring apparatus comprises a light source 1; an optical connector 2 having a semispherical end surface of high reflection attenuation, and is usually referred to as the physical contact (PC) connector; an optical coupler 3; a photo-detector 4; and a device fastener 6. An optical fiber cord (shortened to cord hereinbelow) 8 is the test cord to be measured, and the test cord 8 is provided at each end with first and second PC connectors 11 and 12, respectively.

To determine a connection loss of the cord 8 using the apparatus shown in FIG. 3A, a light of a specific optical power $P_0$dBm (0dBm=1mW) is emitted from the light source 1. The light is injected into a first PC connector 11 of the cord 8 through the optical coupler 3. As shown in FIG. 3B, the cord 8 is connected to the measuring apparatus by inserting the first PC connector 11 to the device PC connector 2 at the device fastener 6. The light propagates through the cord 8 and is emitted from the second PC connector 12 with an attenuated power $P_{10}$dBm. The connection loss $\eta_{10}$dB generated at the interface between the device PC connector 2 and the first PC connector 11 is obtained from the following equation.

$$\eta_{10} = P_0 dBm - P_{10} dBm \, (dB) \quad (1)$$

The determination of the reflection attenuation of a total reflection (fiber) cord 15 will be explained with reference to FIG. 3C. Light is injected into the cord 15 through a first (PC) connector 13 and propagates through the total reflection cord 15 to be reflected totally from the opposite end 16. The first connector 13 of the cord 15 is inserted in the measuring apparatus through the device connector 2 through the device fastener 6. Designating the connection loss of the injected light at the interface between the device connector 2 and the first connector 13 by $\eta_{11}$dB, the optical power $P_{11}$dBm of light injected into the total reflection cord 15 is given by the following equation.

$$P_{11} = P_0 dBm - \eta_{11} dB \, (dBm) \quad (2)$$

The injected light having an optical power Pucem is totally reflected at the opposite end 16 of the total reflection cord 15 at the same optical power $P_{11}$dBm. The return light passes through the device fastener 6 for the second time, (first time when the forward light passes through the device fastener 6) to generate a second connection loss of the same magnitude $\eta_{11}$dB. The optical power $P_{21}$dBm returning to the optical coupler 3 is given, from equation (2), as follows.

$$\begin{aligned} P_{21} &= P_{11} dBm - \eta_{11} dB \\ &= (P_0 dBm - \eta_{11} dB) - \eta_{11} dB \\ &= P_0 dBm - 2\eta_{11} dB \, (dBm) \end{aligned} \quad (3)$$

The optical power $P_{21}$dBm of the return light, to be measured by the photo-detector 4, is attenuated when passing though the optical coupler 3 by an amount of connection loss 3dB. Therefore, the optical power reaching the photo-detector 4 is given by equation (3) as follows.

$$\begin{aligned} P_{31} &= P_{21} dBm - 3dB \\ &= (P_0 dBm - 2\eta_{11} dB) - 3dB \\ &= P_0 dBm - 2\eta_{11} dB - 3dB \, (dBm) \end{aligned} \quad (4)$$

The value of the optical power $P_{31}$dBm given by equation (4) is the reference data for use in determining the reflection attenuation of the test cord 8.

Next, as shown in FIG. 3D, the total reflection cord 15 is replaced with the test cord 8 which is connected to the measuring apparatus through the first connector 11. The light emission section of the second connector 12 of the test cord 8 is coated with a refraction index adjusting coating 9 to suppress reflection therefrom nearly to zero. The first connector 11 of the test cord 8 is connected to the measuring apparatus at the device fastener 6 through the device connector 2.

Although the amount is minute, there is some reflection of the light forwarded from the light source 1 (forward light) within the device fastener 6 at the interface between the device connector 2 and the first connector 11. However, the reflection attenuation from the device connector 2 is so much greater than that from the first connector 11 that it can be neglected. Therefore, the amount of reflection generated at the interface can be attributed almost entirely to the first PC connector 11. Here, the reflection attenuation is expressed as a ratio (dB) of the optical powers of the forward light to the reflected light, therefore, the reflection attenuation R from the first connector 11 is given by the following equation.

$$R = P_0 dBm - P_{42} dBm \quad (5)$$

In the meanwhile, because of the action of the refraction index adjusting coating 9, the optical power $P_{12}$dBm of the forward light into the test cord 8 is almost all transmitted out into the space surrounding the chord 8. The reflected light is received by the photo-detector 4 through the optical coupler 3, but in passing through the coupler 3, $P_{42}$dBm suffers a propagation loss of 3dB. Therefore, the optical power reaching the photo-detector 4 is given by the following equation.

$$P_{52} = P_{42} dBm - 3dB \, (dmn) \quad (6)$$

In this equation (6), although the attenuation value R is expressed as a function of $P_0$dBm and $P_{42}$dBm, the quantity $P_{42}$dBm cannot be measured directly. Therefore, when the value of R is expressed as a function of measurable data using the relationships given in equations (4) and (6), the following equation is obtained.

$$\begin{aligned} R &= P_0 dBm - P_{42} dBm \\ &= (P_{31} dBm + 2\eta_{11} dB + 3dB) - (P_{52} dBm + 3dB) \\ &= P_{31} dBm - P_{32} dBm + 2\eta_{11} dB \, (dB) \end{aligned} \quad (7)$$

Here, the third tern in equation (7) is small in comparison to the first and second terms and is also difficult to measure, therefore, the third term is generally neglected (ignored), and the expression is simplified as:

$$R = P_{31}dBm - P_{s2}dBm (dB) \quad (8)$$

R thus determined from equation (8) is usually taken as the value of the reflection attenuation of the first PC connector 11 of the test cord 8.

The conventional method for determining the connection loss and reflection attenuation presented above is based on connecting a total reflection fiber cord to obtain the reference intensity, but it is not possible to directly measure the connection loss introduced by connection to the optical coupler. The current state of the art is such that, because the reflection loss is small, it is neglected; however, the result is that currently it is not possible to determine the reflection attenuation precisely.

Another problem is that although a same measuring system is used, measurements must be carried out individually for connection loss and reflection attenuation. The result is that the measuring process is cumbersome and time-consuming.

SUMMARY OF THE INVENTION

It is an object of the present invention to provide an apparatus for measuring connection loss and reflection attenuation which presents no connection loss at the interface between an optical coupler of the apparatus and the total reflection fiber cord so as to improve the precision of measurement, and which enables measurements to be carried out simply and quickly.

The object has been achieved in an apparatus comprising: a light source for generating forward light; an optical coupler for transmitting the forward light through the first optical connector into the optical fiber cord, and for receiving reflected light reflected from the second optical connector through the optical fiber cord; a photo-detector for determining optical power of the reflected light passing through the optical coupler; and a total reflection means for receiving the forward light and reflecting the forward light back to the optical fiber cord without loss in optical power.

The construction of the apparatus presented above enables simple and accurate determination of optical power loss caused by connection loss and reflection attenuation, partly because there is no need to switch to a total reflection fiber cord for the determination of reference data.

The feature of the total reflection device is that it has a total reflection concave mirror having a curvature so as to make an intimate contact with a convex spherical section provided on the second optical connector of the optical fiber cord, thereby permitting a Simple connection of an end of the test cord to be made for the determination the reference data.

DESCRIPTION OF THE PREFERRED EMBODIMENTS

Figure 1A:
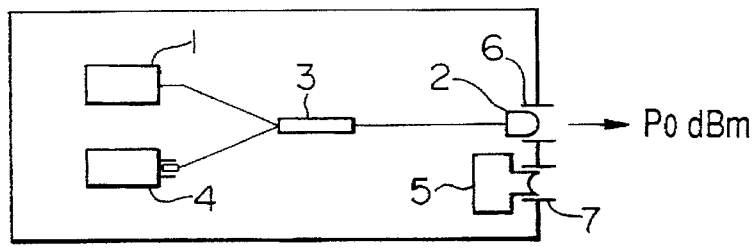
FIG. 1A is a schematic diagram of an embodiment of the measuring apparatus of the present invention.

An embodiment of the present measuring apparatus for determining connection loss and reflection attenuation will be described with reference to FIGS. 1 and 2. For simplicity, those components which are the same as the conventional components are referred to by the same reference numerals, and their explanations are omitted.

FIG. 1A shows that the present measuring apparatus is provided with a total reflection device 5 which is constructed so as to reflect all the light injected from an optical coupler 3. The total reflection device is attached to the apparatus with a device fastener 7 which has the same construction as that of the device fastener 6.

Figure 2A:
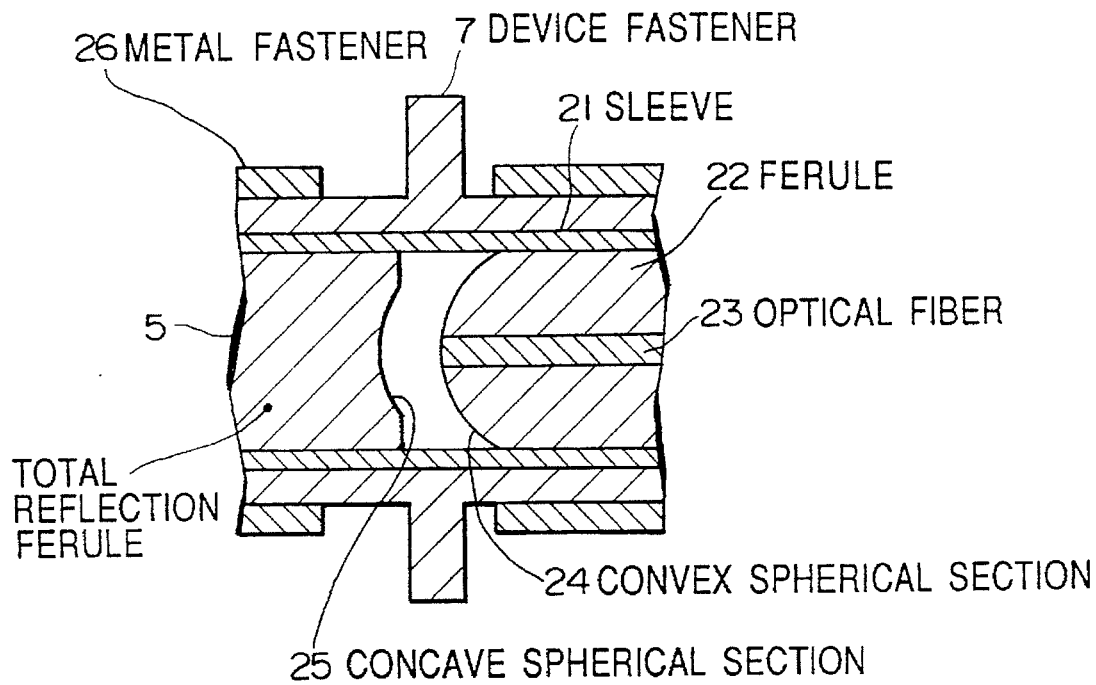
FIG. 2A is a cross sectional view of the total reflection device before connection.
Figure 2B:
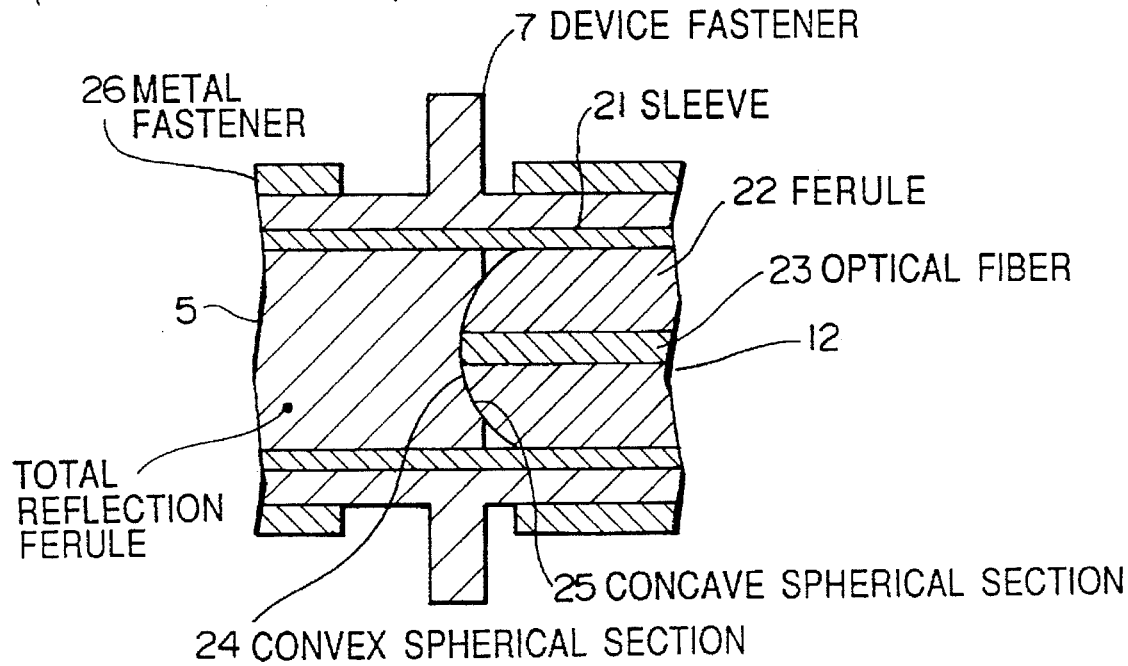
FIG. 2B is a cross sectional view of the total reflection device after connection.
Figure 3A:
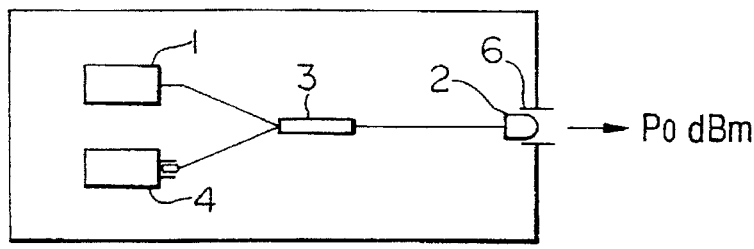
FIG. 3A is a schematic diagram of a conventional measuring apparatus.
Figure 3B:
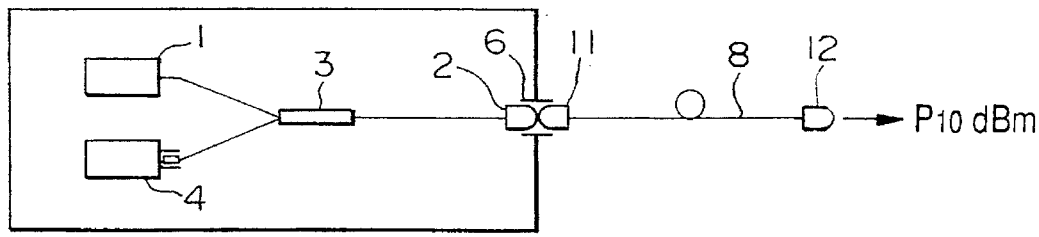
FIG. 3B is a schematic diagram of the conventional arrangement of the apparatus for determining a connection loss.
Figure 3C:
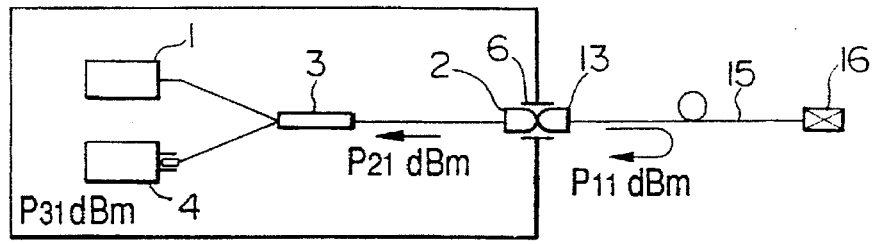
FIG. 3C is a schematic diagram of the conventional arrangement for determining the reference intensity.
Figure 3D:
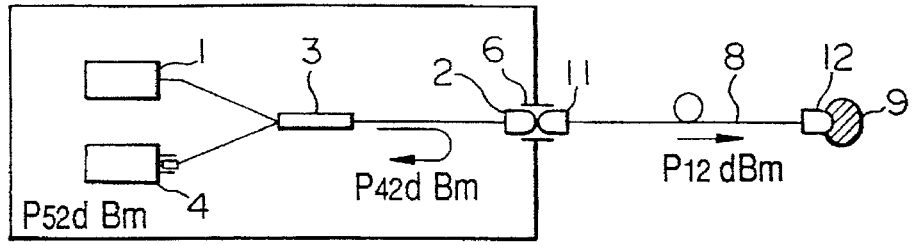
FIG. 3D is a schematic diagram of the conventional arrangement for determining a reflection attenuation.

FIG. 2A and 2B show the construction details of the total reflection device to explain the operation of the device 5. FIG. 2A shows the device 5 just prior to completing the connection, and FIG. 2B shows the device 5 after completing the connection. The device fastener 7 is provided with an internal sleeve 21; a ferule 22 of the PC connector 12 of the test cord 8; an optical fiber 23; a convex spherical section 24 of the PC connector 12 of the target fiber cord 8; and a concave spherical mirror 25 of the total reflection device 5.

The convex spherical section 24 of the PC connector 12 has a different shape of curvature depending on the properties of the material of construction of the ferule 22. When the ferule is made of stainless steel, the arc radius is 60 nm while for zirconia it is 20 mm.

The shape of the curvature of the concave spherical mirror 25 of the total reflection device 5 is chosen to match that of the convex spherical section 24 of the ferule 22. Therefore, when the second connector 12 of the test cord 8 is inserted into the total reflection device 5 through the device coupler 7, the convex spherical mirror 25 of the total reflection device 5 and the convex spherical section 24 of the PC connector 12 are in a perfect intimate contact with each other. Therefore, as illustrated in FIG. 1C, when the target fiber cord 8 is coupled to the total reflection device 5, forward light propagating through the cord 8 and injected into the device 5 is totally reflected back at the mirror 25. The total reflection device 5 is connected to the device fastener 7 by means of metal fasteners 26, and is rigidly held therein by means of the internal sleeve 21.

Referring to the overall apparatus shown in FIG. 1A, the power of the forward light (generated from the light source 1, propagated through the optical coupler 3 and output from the PC connector 2) is designated by $P_0 dBm$ (0dBm=1mW).

The method of measurement using the present apparatus will be illustrated with reference to FIG. 1B-1D.

Figure 1B:
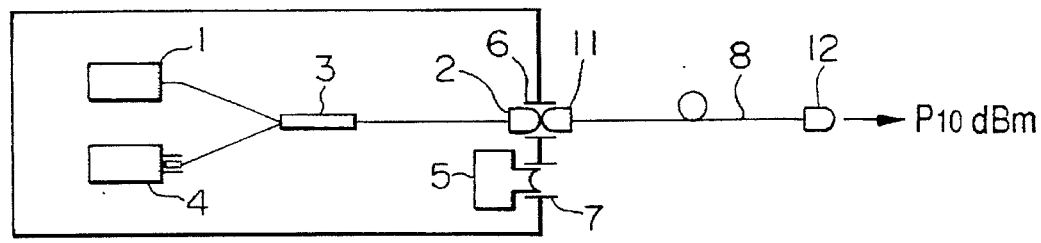
FIG. 1B is a schematic diagram of the arrangement of the present apparatus for determining a connection loss.
Figure 1C:
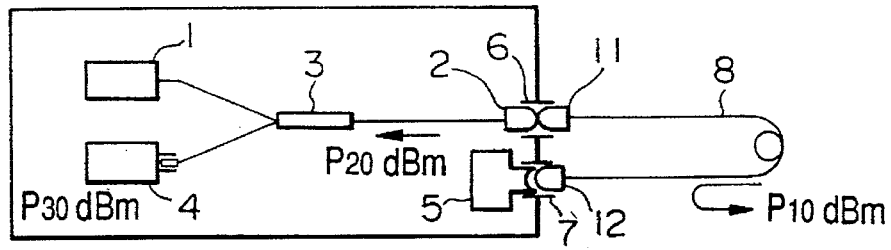
FIG. 1C is a schematic diagram of the arrangement of the present apparatus for determining the reference intensity.

To measure the connection loss of the test (fiber) cord 8, the first (PC) connector 11 of the test cord 8 is connected to the device (PC) connector 2 of the apparatus through the device fastener 6, as illustrated in FIG. 1B. Designating the power of the light emitted from the second (PC) connector 12 at the other end of the optical fiber cord 8 by $P_{10}$dBm, the connection loss $\eta_0$ dB generated at the interface between the device PC connector 2 and the first PC connector 11 is given by the following equation.

$$\eta_0 = P_0 dBm - P_{10} dBm (dB) \tag{9}$$

Next, in preparation for measuring the reflection attenuation, reference light measurement is carried out, as shown in FIG. 1C. The connection at the first connector 11 is unchanged, and the second connector 12 is connected to the total reflection device 5 through the device fastener 7. As explained above, there is no connection loss at the device 5 interface, and all of the light is reflected back at the total reflection mirror 5. Therefore, the reflected optical power is the same as the optical power output from the second connector 12. The optical power $P_{10}$dBm of the return light from the device 5 suffers the same connection loss $\eta_0$ in passing through the device fastener 6 on its return path, as in its forward path. Therefore, the optical power $P_{20}$dBm returning to the optical coupler 3 is given by the following equation.

$$\begin{aligned} P_{20} &= P_{10} dBm - \eta_0 dB \\ &= (P_0 dBm - \eta_0 dB) - \eta_0 dB \\ &= P_0 dBm - 2\eta_0 dB \, (dBm) \end{aligned} \tag{10}$$

Further, the reflected light arriving at the photo-detector 4, though the optical coupler 3, experiences a propagation loss of 3 dB when passing through the optical coupler 3. Therefore, the optical power $P_{30}$dBm arriving at the photo-detector 4 is obtained from equation (10) as follows.

$$\begin{aligned} P_{30} &= P_{20} - 3dB \\ &= (P_0 dBm - 2\eta_0 dB) - 3dB \\ &= P_0 dBm - 2\eta_0 dB - 3dB \, (dBm) \end{aligned} \tag{11}$$

The optical power $P_{30}$dBm thus obtained is the reference optical power in determining the reflection attenuation of the test cord 8.

Figure 1D:
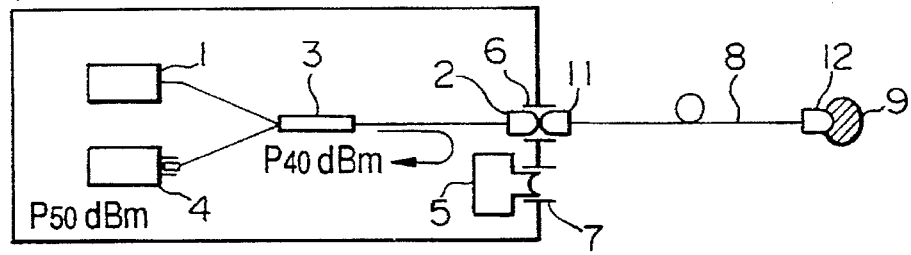
FIG. 1D is a schematic diagram of the arrangement of the present apparatus for determining a reflection attenuation.

Following the connection loss measurement, the reflection attenuation is measured as shown in FIG. 1D. The second connector 12 of the test cord 8 is removed from the device fastener 7, and a refraction adjusting coating 9 is applied on the light output surface of the second connector 12 so that the reflection from this surface can be held nearly to zero. As in the conventional apparatus, only that portion of the light from the light source 1 which is reflected from the interface between the device connector 2 of the apparatus and the first connector 11 of the test cord 8, is returned to the optical coupler 3. The reflected light from the interface having an optical power of $P_{40}$dBm suffers a propagation loss of 3dB in passing through the optical coupler 3. Therefore, the optical power of the light $P_{50}$dBm arriving at the photo-detector is given by the following equation.

$$P_{50} = P_{40} dBm - 3dB (dBm) \tag{12}$$

and the reflection attenuation is give by:

$$R = P_0 dBm - P_{40} dBm (dBm) \tag{13}$$

and from equations (11) and (12), R is also given by:

$$\begin{aligned} R &= P_0 dBm - P_{40} dBm \\ &= (P_{30} dBm + 2\eta_0 dB + 3dB) - (P_{50} dBm + 3dB) \\ &= P_{30} - P_{50} + 2\eta_0 dB \, (dB) \end{aligned} \tag{14}$$

It can be seen clearly that the incorporation of a total reflection device 5 (which can reflect all the light propagated in the test cord 8) in the measuring apparatus increases the precision of measurement while providing the same results when the light is passed through forward and return paths. The methodology is much more convenient than that in the conventional apparatus, because there is no need for changing the PC connections to the apparatus for two types of measurements, connection loss and reflection attenuation. The overall result is that the measurement process has been simplified and shortened.

What is claimed is:

1. An apparatus for determining an optical power loss caused by a connection loss and a reflection attenuation of an optical fiber cord, having a first optical connector at one end and a second optical connector at an opposite end, comprising:

a light source for generating forward light;

an optical coupler for transmitting said forward light through said first optical connector into said optical fiber cord, and for receiving reflected light reflected from said second optical connector through said optical fiber cord, said first and second optical connectors being identical in structure;

a photo-detector for determining optical power of said reflected light passing through said optical coupler; and a total reflection means for receiving said forward light and reflecting said forward light back to said optical fiber cord without loss in optical power, said total reflection means being connected by said second optical connector and being a unitary portion of the apparatus.

2. An apparatus as claimed in claim 1, wherein said total reflection means is provided with a total reflection concave mirror having a curvature so as to make an intimate contact with a convex spherical section provided on said second optical connector of said optical fiber cord.

* * * * *